Patented Jan. 30, 1945

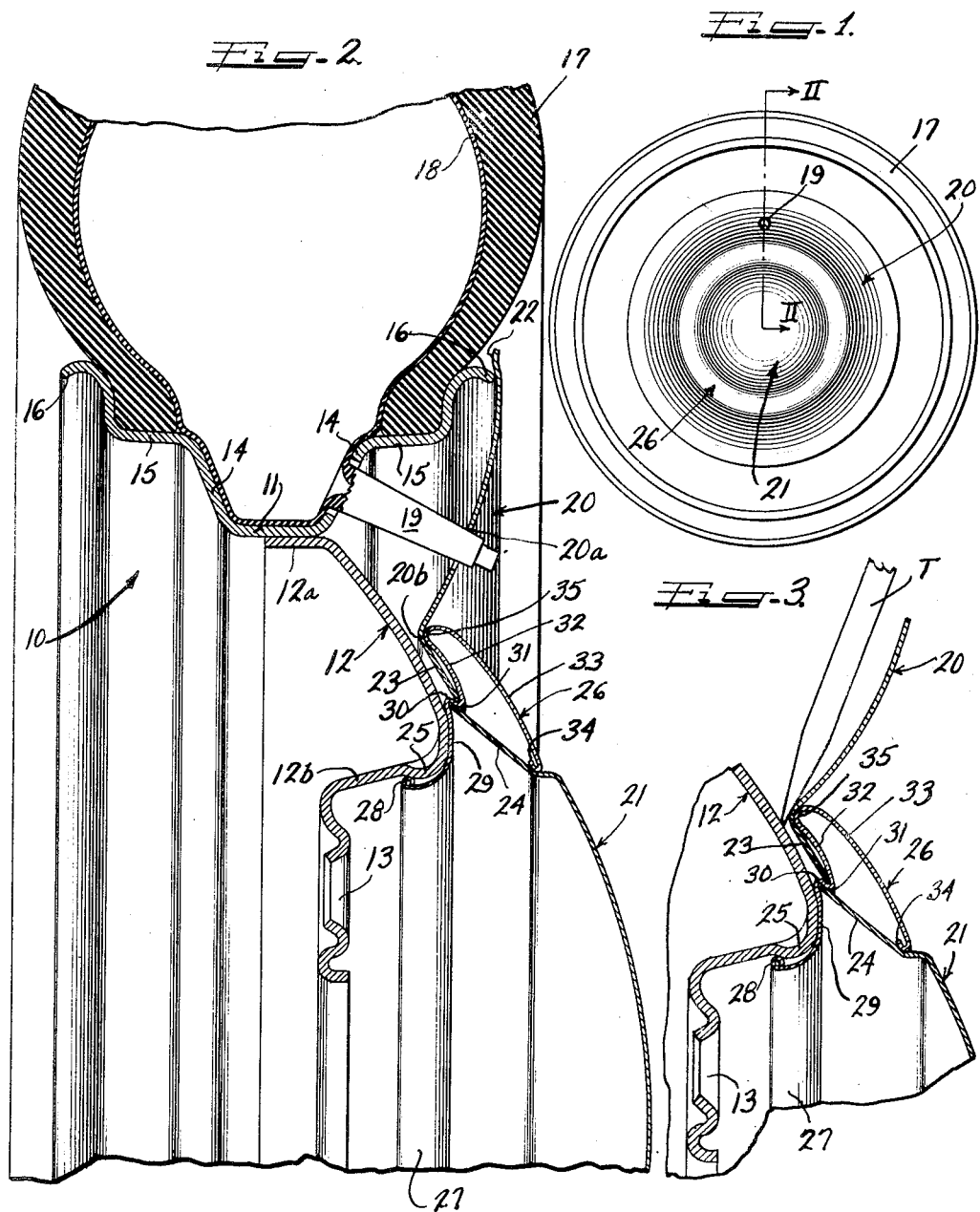

2,368,252

UNITED STATES PATENT OFFICE 2,368,252

WHEEL STRUCTURE

George Albert Lyon, Allenhurst, N. J.

Application August 20, 1943, Serial No. 499,323

7 Claims. (Cl. 301—37)

This invention is directed to an improved wheel structure and relates more particularly to an improved cover assembly therefor.

It is an important object of the present invention to provide for a cover assembly adapted for disposal over the outer side of a wheel structure, an improved retaining arrangement wherein a common instrumentality is utilized for maintaining a multi-part cover assembly over the wheel structure, for rigidifying the peripheral borders of the various parts of the cover assembly, and for imparting an ornamental bead effect to the cross-sectionally intermediate portion of the cover assembly, this bead being arranged to conceal the junction between the parts of the cover assembly which are preferably concentrically arranged.

It is still another object of the invention to provide for a multi-part cover assembly having an outer annular trim member and a central hub cap simulating cover member, an intermediate retaining annulus which is constructed to retainingly receive the inner peripheral margin of the outer trim member and the outer peripheral margin of the hub cap simulating member to retain them in concentric relationship with one another, said retaining member having a portion arranged for detachable engagement with the wheel structure and having another portion arranged to overlie the junction between the parts of the cover assembly to conceal the junction and to impart an intermediate ornamental effect thereto.

It is still another object of the invention to provide for a wheel structure a cover assembly including a radially outer annular portion constructed from synthetic sheet plastic material or the like and having physical characteristics enabling it to be self-sustaining as to form and yet resiliently flexible under the influence of distorting pressures, and whereby the cover immediately snaps into its initial intended position, upon release of the distorting pressures, the radial cover part having a cross sectional configuration of such shape and magnitude that it extends over the outer side of the tire rim of a wheel structure with which it is associated to conceal the same, and has a cross-sectional curvature substantially simulating the side wall of a tire in a wheel with which it is associated, thereby to constitute in effect a continuation of the side wall of the tire and to give the appearance of being a continuation thereof, and further to give the appearance of being the white side wall of a massive tire, when colored white.

It is still another object of the invention to provide an improved, unitary, annular retaining element for maintaining the various parts of a multi-part cover assembly over the outer side of a wheel structure, said retaining annulus being provided with an axially inner portion arranged for detachable engagement with a wheel structure, an outer portion arranged to overlie the outer surface of the junction between the parts of the cover assembly to conceal the same and to ornament and rigidify the intermediate portion of the cover assembly, and also having an intermediate part configurated to receive the radially inner edge of an outer annular cover member and the radially outer edge of an inner circular cover member.

Still another object of the invention is to provide a multi-part cover assembly for a wheel structure in which the parts are constructed principally from a light material such as synthetic plastic or the like, whereby the unsprung weight of the vehicle with which it is associated is greatly reduced, there being improved retaining means for facilitating the attachment and maintenance of the cover assembly thus formed on the wheel structure, in an improved and efficient manner.

In accordance with the general features of the invention there is provided herein a wheel structure having a drop-center type tire rim and a central load bearing portion connected therewith, said central load bearing portion being provided with retaining protuberances extending from the outer surface thereof, and a multi-part cover assembly for disposition over the outer side of the wheel structure, said cover assembly including a radially outer annular portion arranged for disposition over the outer side of the tire rim to conceal the outer surface of the flanges thereof and preferably extending radially beyond the edge portion of the tire rim to conceal the junction between the tire and the rim, said annular cover portion being constructed from synthetic plastic material and having physical characteristics enabling it to be self-sustaining as to form and yet resiliently flexible upon the impression of deflecting forces thereagainst, and having a cross-sectional configuration whereby it substantially simulates the curvature of the side wall of a tire disposed in the tire rim, to give the appearance of being a part thereof and a continuation thereof, said cover assembly also including a central circular hub cap simulating cover portion arranged to overlie and conceal the central part of the wheel structure, there being provided annular retaining means for maintaining the cover assembly upon the wheel structure, said retaining means including a substantially axially inwardly extending snap-on retaining portion for detachably engaging with the protuberances extending from the outer surface of the wheel structure, an intermediate annular portion formed cross-sectionally with a reentrant configuration to provide a radially outwardly extending groove and a radially inwardly extending groove for receiving the marginal edges of the hub cap cover member and the annular cover member, respectively, in retaining engagement therewith, and an axially outer beadlike portion for overlying the junction between the cover parts to conceal the same and to rigidify and further ornament the intermediate portion of the cover assembly.

Other objects and advantages of the invention will be apparent from the following description and accompanying drawing, in which—

Figure 1 is a side elevational view of a wheel structure embodying my invention.

Figure 2 is a fragmentary radial cross sectional view taken on the line II—II of Figure 1; and Figure 3 is a fragmentary radial cross sectional view of the construction shown in Figure 2, showing the manner in which the cover assembly may be removed from the wheel structure.

As best shown in Figure 2, the wheel structure embodied herein includes a tire rim 10 having a base flange 11 and a central load bearing portion 12 having an axially inwardly extending peripheral flange 12a which may be secured to the base flange 11 of the tire rim as by riveting, welding or the like, to provide a unitary wheel structure.

The central load bearing portion 12 is further provided with a radially inward bolt-on flange 13, this bolt-on flange being available for attachment to a suitable appurtenance of the vehicle to which the wheel is attached, such as the brake drum or the like.

The tire rim 10 is further provided with opposite side wall flanges 14, opposite intermediate flanges 15, and opposite edge portions 16, between which may be retained the radially inner parts of a tire 17 having a tire tube 18 and a valve stem 19 which extends through a suitable aperture with which it is aligned formed in the adjacent side wall flange 14.

The multi-part cover assembly disclosed herein includes a radially outer annular part 20 and a central hub cap simulating part 21, these cover parts preferably being arranged in concentric relationship over the outer side of the wheel structure to provide a continuous cover member for concealing the entire outer surface of the wheel.

The cover member 20 is provided with an aperture 20a through which the outer end of the valve stem 19 may project to render it accessible for application of the nozzle of an air hose for inflation of the tire. This cover member 20 is preferably formed from synthetic plastic sheet material and has physical characteristics enabling it to be flexed temporarily locally upon the imposition of deflecting pressures thereagainst and yet whereby it snaps back into initial position upon removal of the distorting flexing pressure. Additionally, the cover annulus 20 is provided with a cross sectional configuration of such curvature and magnitude that it extends over the outer side of the tire rim and radially inwardly beyond the junction of the tire rim and the central load bearing portion 12, and substantially simulates the curvature of the adjacent side wall of the tire 17 in the tire rim to give the appearance of being a part thereof and to appear as a continuation thereof and as a white side wall thereof, when colored white. As will be seen from Figure 2, the radially outer part of the cover member 20 preferably extends radially outwardly beyond the edge portion 16 of the tire rim, as at 22, to entirely conceal the radially outer part of the wheel.

The cover member 20 is further provided with a radially inner marginal portion 23 which is preferably obliquely disposed and extends generally radially inwardly, axially outwardly, while the central hub cap cover portion 21 is provided with a radially outer marginal portion that is obliquely disposed and extends generally radially outwardly and axially inwardly, as shown at 24, these latter margins being utilized, in a manner to be presently described, in retaining the respective cover members as a unitary cover assembly upon the wheel structure.

While many different forms of retaining structures may be utilized in conjunction with my invention, the central body part 12 of the wheel structure shown herein is provided, on the generally axially extending flange 12b between the radially outer part thereof and the bolt-on flange 13 thereof, with radially inwardly extending protuberances 25 which are circumferentially, circularly spaced to receive the cover assembly in retaining, detachable engagement to be explained presently.

The retaining structure embodying my invention comprises an annulus 26 preferably formed from a rigid material such as sheet metal or the like, whereby an enamel or polished, lustrous finish may be applied thereto and whereby the cover assembly generally is reinforced and rigidified at an intermediate point thereof to greatly strengthen the same.

This annulus 26 includes, generally, three sections which comprises a part for providing retaining engagement with the wheel structure, a part for providing retaining engagement thereof with the cover elements 20 and 21, and a part for overlying the cover to provide a rigidifying, ornamental, intermediate finish thereto.

The wheel retaining part includes a generally axially inwardly extending resilient snap-on flange 27 terminating in a rolled bead 28, this flange and bead structure being adapted to be flexed out of round when the cover assembly is urged axially inwardly of the wheel structure so that the bead 28 overrides and is deflected inwardly by the humps or protuberances 25, the bead 28 and the flange 27 being arranged to again assume a circular configuration after the radially inner peaks of the humps or protuberances 25 have been passed. The flange 27 merges into a substantially radially extending annular part 29 which preferably is disposed in surface abutment with the adjacent portion of the outer surface of the central load bearing portion 12 when the cover assembly is in its ultimate position upon the wheel structure. The radially extending flange 29 merges into the intermediate annular portion of the annular member 26 which is reentrantly configurated cross sectionally to provide a rib 30 defining a radially inwardly extending annular channel and a rib 31 defining a radially outwardly extending annular channel, this portion of the cover merging into a flange 32 which terminates in a part bent back thereon as at 33 and preferably provided with an axially outwardly convex configuration to provide an ornamental bead for an intermediate part of the cover assembly, as will be explained presently. Preferably, the bead 33 is turned back upon itself axially inwardly as at 34 to provide a smooth cover-engaging edge.

As will clearly be seen from Figure 2, the flange 23 of the cover member 20 is arranged to extend along the axial inner side of the flange 32 of retaining member 26 and then into the radially outwardly facing channel defined by the bead 31, while the flange 24 of the central hub cap cover member is arranged to extend radially outwardly and axially inwardly behind the turned-back edge 34 of the portion 33 of the retaining member, and the edge thereof is then disposed in the radially outwardly facing channel defined by the bead 30 at the intermediate part of the retaining member 26.

With the foregoing construction it will be seen that the cover members are securely maintained together in unitary relationship by their engagement with the retaining member 26. Such a construction provides an efficient arrangement for securing the unitary cover assembly to the wheel structure in detachable, snap-on, pry-off relationship, and furthermore the intermediate reentrant configuration together with the flanges 32 and 33 greatly rigidify the cover assembly against both radial and axial deflection, the strengthening against the axial deflection being further augmented by the provision of the axially inwardly extending flange 27.

While the cover member 21 may, of course, be formed from synthetic plastic sheet material as is the cover member 20, it might also be formed from thin sheet metal, whereby it may be finished to provide a highly lustrous central portion for the cover, or may be enameled to provide a pleasing color contrast with the color imparted to the outer cover member 20. In any event, it is found that when the cover assembly is removed from the wheel structure with a pry-off operation, the assembly is inclined to jump therefrom and fall upon the ground. Under the circumstances, it will be seen that the outer resilient, temporarily flexible cover member 20 serves as a bumper upon which the cover assembly may land, to protect against breakage thereof. It will also be seen that whether both of the cover members are made from resilient plastic material or merely the outer member 20 thereof is made from such material, the unsprung weight of the vehicle with which the cover is associated is greatly reduced, since this cover assembly has been found to amount to only one-third of the total weight of the usual all-metallic cover assembly.

The manner in which the cover assembly may be removed from the wheel structure by a pry-off operation is clearly shown in Figure 3. In order to so remove the assembly it is merely necessary to flex the cover member 20 radially outwardly axially inwardly at a localized part thereof to permit insertion at the point of a pry-off tool T behind the assembly and against the adjacent portion of the outer surface of the central load-bearing portion 12, whereby upward movement of the tool T as shown in Figure 3 with an intermediate portion thereof fulcrumed against the adjacent part of the edge portion 16, will cause outward movement of the point of the tool and thus outward movement of the retaining member 26 to draw the bead 28 thereof axially outwardly over the humps 25 to disengage the same from the wheel. During this operation it will be seen that the U-shaped junction 35 between the flanges 32 and 33 of retaining member 26 serves as a backing instrumentality for the corner junction 20b of the cover member 20 between the body portion and the flange 23 thereof, and thus the relatively fragile cover member 20 is not dented or damaged during the pry-off operation.

What I claim is:

1. In a cover assembly for disposition over the outer side of a wheel structure having a tire rim, a central load bearing portion and cover retaining means thereon, a reinforcing, retaining annulus and a multi-part cover comprising a radially outer annular, cover part and a concentric, central hub cap cover part, said retaining annulus including a wheel engaging portion, an intermediate portion arranged to retainingly receive in concentric relationship the radially outer and radially inner margins of the central cover part and the annular cover part respectively and also including a rigidifying portion arranged to overlie the annular, axially outer part of the surface of the cover assembly including the junction between the cover parts.

2. In a cover assembly for disposition over the outer side of a wheel structure having a tire rim, a central load bearing portion and cover retaining means thereon, a reinforcing, retaining annulus and a multi-part cover comprising a radially outer annular, resilient, plastic sheet cover part and a concentric, central hub cap cover part, said retaining annulus including a generally radially inwardly, axially inwardly, extending retaining portion arranged for detachable engagement with the wheel structure, an intermediate portion cross-sectionally configurated to provide radially outwardly facing and radially inwardly facing channels for receiving respectively the edges of the annular cover part and the central hub cap cover part in retaining relationship and an axially outer portion configurated to provide a generally radially extending annulus for disposition over the junction of said cover parts with said retaining means to conceal the same and to rigidify the resulting cover assembly.

3. In a cover assembly for disposition over the outer side of a wheel structure having a tire rim, a central load bearing portion and cover retaining means thereon, a reinforcing, retaining annulus and a multi-part cover assembly comprising a radially outer annular, resilient, plastic cover part and a concentric, central hub cap cover part, said retaining annulus including at the inner part thereof a wheel engaging portion arranged for detachable engagement with the wheel structure, a circular intermediate portion configurated re-entrantly to provide substantially radially oppositely extending channels and ribs defining the same for rigidifying the retaining member and for retainingly receiving the respective edges of said cover parts, and an outer generally radially extending portion for concealing the junction of said cover parts with said retaining annulus.

4. In a wheel structure having a tire rim and a central load bearing portion, a cover assembly for disposition over the outer side of said wheel structure including an outer annular part formed from synthetic plastic material and having physical characteristics enabling it to be flexed temporarily locally and yet whereby said annular cover part will snap back to its original configuration upon release of distorting pressures therefrom, and a central circular hub cap simulating cover part disposed concentrically to said first named cover part, said annular cover part having a cross-sectional configuration of such curvature and magnitude that it substantially simulates the side wall of a tire in the tire rim and extends radially inwardly from the radially outer extremity of the tire rim to a point radially inwardly of the junction of the tire rim and the central load bearing portion, and retaining means for maintaining said cover parts together and on the wheel structure, said retaining means including an annulus having a portion for detachable engagement with the wheel structure, a portion for retainingly receiving the adjacent edges of said cover parts and an outer portion arranged to overlie a portion of the outer surface of the cover parts to rigidify the same.

5. In a wheel structure having a tire rim and a central load bearing portion, a cover assembly for disposition over the outer surface thereof, said cover assembly having an outer annular part arranged for disposition over the radially outer part of the wheel structure and a concentric, central hub cap simulating part, means for maintaining said cover parts together in concentric relationship as a unitary structure and for rigidifying the resulting assembly, said means including an annulus having a portion arranged for detachable engagement with the wheel structure and an intermediate portion formed cross-sectionally to envelop the respective inner and outer edges of the outer annular and inner circular cover parts to retainingly engage and rigidify the same, said retaining annulus also including a portion arranged for generally radial disposition over the outer side of the cover assembly to provide a bead therefor, said retaining member being formed from relatively rigid sheet material.

6. In a wheel structure including a tire rim and a central load bearing portion, a cover assembly for disposition over the outer side thereof including concentrically disposed radially outer annular and radially inner circular cover parts, said outer part being formed from resilient plastic sheet material and retaining means for securing the same to the wheel structure and for rigidifying the cover assembly including an annulus formed from relatively rigid material and having an inner portion arranged for detachable engagement with the wheel structure and an intermediate portion arranged to retainingly engage and rigidify the respective radially inner and radially outer edges of the annulus cover part and the circular cover part, said retaining means having an outer portion formed to bear against intermediate portions of the respective cover parts to support the same and having a portion arranged for radial bridging relationship between the engaged intermediate portions of the cover parts to provide an axially outwardly exposed bead for the cover assembly.

7. In a cover assembly for disposition over the outer side of a wheel having a tire rim, a central load bearing portion and cover retaining means thereon, a radially outer cover part and a central circular cover part for disposition in concentric relationship to one another, means for maintaining this relationship and for securing the cover assembly to a wheel, said means comprising a retaining annulus having a wheel engaging portion, an annular cover receiving portion arranged to receive adjacent edges of the cover parts to afford a unitary structure and a generally radially disposed annular portion for overlying the portion of the retaining annulus which is in engagement with the cover parts to strengthen the cover assembly and to provide a bead on the outer side thereof.

GEORGE ALBERT LYON.